United States Patent [19]

Ratskó et al.

[11] 4,402,522

[45] Sep. 6, 1983

[54] JACKKNIFING ANGLE INFLUENCING APPARATUS FOR ARTICULATED MOTOR VEHICLE

[75] Inventors: István Ratskó; József Ivony; Nándor Liptai, all of Budapest, Hungary

[73] Assignee: Autóipari Kutató Intézet, Budapest, Hungary

[21] Appl. No.: 241,556

[22] Filed: Mar. 9, 1981

[30] Foreign Application Priority Data

Mar. 10, 1980 [HU] Hungary .............................. 559/80

[51] Int. Cl.³ ...................... B60D 1/00; B62D 53/06
[52] U.S. Cl. ................................. 280/432; 280/446 B
[58] Field of Search ............... 280/432, 446 B, 424, 280/403; 180/139

[56] References Cited

FOREIGN PATENT DOCUMENTS

| | | | |
|---|---|---|---|
| 2161579 | 7/1973 | Fed. Rep. of Germany ... | 280/446 B |
| 2748713 | 5/1979 | Fed. Rep. of Germany ...... | 280/432 |
| 2248695 | 5/1975 | France ............................ | 280/446 B |
| 2324475 | 4/1977 | France ............................ | 280/446 B |

Primary Examiner—John A. Pekar
Attorney, Agent, or Firm—Gabriel P. Katona

[57] ABSTRACT

In an anti-jackknifing apparatus for an articulated motor vehicle having a device filled with a pressure medium, the volume of which varies according to the magnitude of the jackknifing angle. The device has two movable opposite walls, each connected to one of the vehicle units. The device comprises an air spring connected to a working medium supply source.

6 Claims, 3 Drawing Figures

JACKKNIFING ANGLE INFLUENCING APPARATUS FOR ARTICULATED MOTOR VEHICLE

BACKGROUND OF THE INVENTION

The invention relates to jackknifing angle influencing apparatus for an articulated motor vehicle, wherein a pneumatic device is built into the apparatus around the articulation that interconnects two vehicle units and the pneumatic device exerts reaction torque against an increase of the jackknifing angle. Construction of the apparatus suitable for a trailer with a driven axle is provided with a jackknifing angle limiting unit, that limits the permissible jackknifing angle specified for the motion-dynamic characteristics.

There are several solutions to prevent the abnormal jackknifing of articulated motor vehicles, i.e. when drifting in a curve and jackknifing during braking.

Part of the known devices step into action in case of excessive jackknifing angle and prevent further increase of the jackknifing angle. These are known as locking devices.

Proposals appeared recently for the construction of apparatuses functioning more efficiently, which influence the jackknifing angle of the articulated vehicle at all times in the full range of the angles, and their operation prevents the occurrence of abnormal jackknifing angle right at the outset. The proposed apparatuses consist of a double-acting hydraulic device and a hydropneumatic energy storage unit being in hydraulic connection with the working spaces of the hydraulic device. Volumetric variation of the hydraulic working space entails the volumetric variation of the pneumatic space of the hydropneumatic energy storage unit, as well as the pressure variation; at increasing jackknifing angle the pressure increases in the pneumatic space, whereby the anti-jackknifing force increases. A flow regulating valve is arranged in the pipe connecting the hydraulic working space and hydropneumatic energy storage unit, the characteristic of which is such, that it shows increasing resistance at increasing jackknifing angular velocity. The device does not prevent the occurrence of a jackknifing angle greater, than a certain jackknifing angle in any operating position, thus it is not suitable for locking when the specified permissible maximum jackknifing angle is overstepped.

The apparatus is fairly costly, since two independent hydraulic devices and a connected hydropneumatic energy storage unit have to be built in.

SUMMARY OF THE INVENTION

The invention is based on the recognition, that influencing of the jackknifing angle via a pneumatic pressure medium is realizable in a simpler way and at a lower cost than those known so far, and a simple and inexpensive pneumatic jackknifing angle influencing device can be economically combined with the locking device —in a given case with one of the known devices—that limits the existing permissible jackknifing angle.

The jackknifing angle influencing apparatus according to the invention is formed as an air spring.

The invention is a jackknifing angle influencing apparatus for an articulated motor vehicle, having a device filled with pressure medium, the volume of which varies according to the magnitude of the jackknifing angle, one of the opposite walls of which moving in relation to each other at the jackknifing angle deviating from 0° is connected to one of the vehicle units, while the other wall to the other vehicle unit through motion- and power-transmission elements, the apparatus being formed as an air spring, connected to a working medium supply source.

In the preferred embodiment of the invention stops are formed on one of the vehicle units, limiting each extreme position of the rigid walls of the air spring moving in relation to each other, the mobile walls are surrounded by a frame which is connected to one of the arms of the angle lever embedded in the vehicle unit carrying the limit stops, the other arm of the angle lever is connected to a push bar fixed to the other vehicle unit.

In the preferred embodiment of the invention the jackknifing angle influencing apparatus has a locking unit which is provided with a hydraulic device with at least two working spaces, having mobile elements—cylinder and piston—connected to one and to the other vehicle unit respectively, the working spaces are connected with each other through a hydraulic coupling element of progressive characteristic, said element is formed preferably as a regulator unit of the jackknifing angle limiting locking device.

The invention is described in detail by way of three examples of the embodiment, with the aid of FIGS. 1-3.

DETAILED DESCRIPTION OF THE PREFERRED EMBODIMENTS

Figure 1:
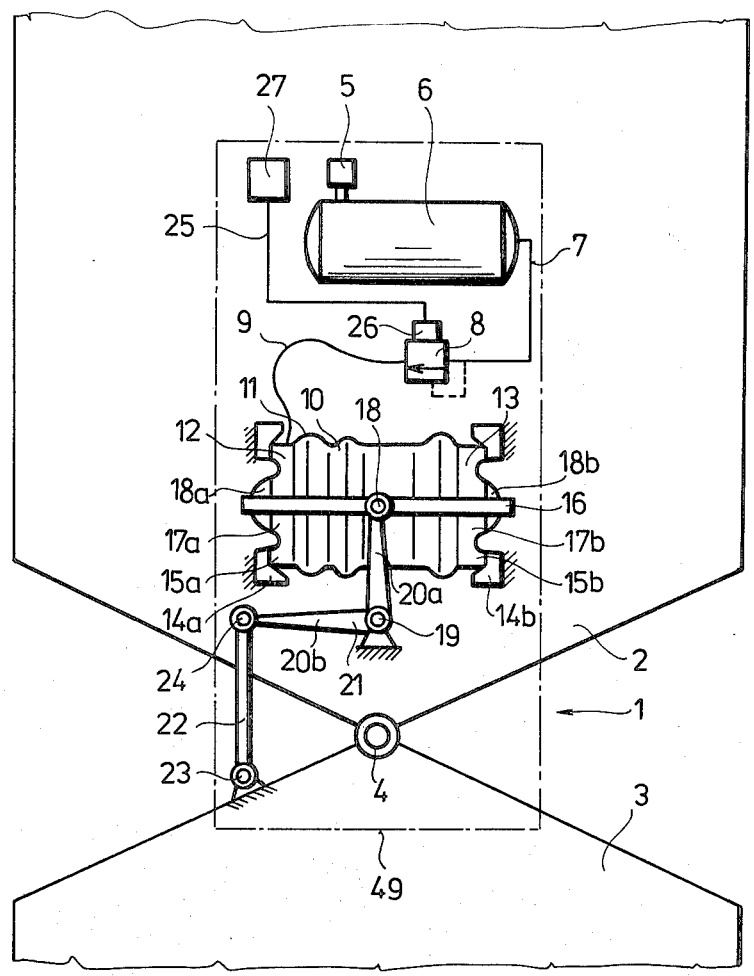
FIG. 1. A schematic representation of one embodiment of the jackknifing angle influencing apparatus according to the invention.

FIG. 1 illustrates the simplest solution of the jackknifing angle influencing apparatus according to the invention regarded as the basic construction. Front vehicle 2 and trailer 3 of articulated motor vehicle 1 are connected to each other with articulation 4. The air brake system, not illustrated, of the articulated motor vehicle 1 has air tank 6 supplied with compressor 5, air spring 10 with pipe 9 connected through pressure regulating valve 8 and pipe 7 to the air tank 6. Flexible wall 11 of the air spring 10 is sealed to mobile rigid walls 12 and 13. At jackknifing angle 0° the mobile rigid wall 12 of the air spring 10 is supported by stop 14a on the front vehicle 2, the mobile rigid wall 13 is supported by stop 14b on the front vehicle 2, which stops limit the extreme positions of the mobile walls 12 and 13. The air spring 10 is surrounded by frame 16 with mobile stops 18a and 18b formed on the inner side, and with the counter-stop surfaces 17a and 17b which are formed on the mobile rigid walls 12 and 13. Arm 20a of angle lever 21 embedded around pin 19 on the front vehicle 2 is connected to pin 18 arranged in the symmetry axis of frame 16, with arm 20b is connected through push bar 22 to supporting articulation 23 fixed externally in relation to the longitudinal axis of the trailer 3.

The pressure regulating valve 8 is in functional connection with driver unit 26, which is connected to control unit 27 via signal transmitting cable 25. The control unit 27 transmits an actuating signal at a specified value of the selected motion-dynamic characteristic to the driver unit 26. The selected motion-dynamic characteristic is for instance the articulated vehicle, or the load of one of its axles.

The apparatus functions as follows:

From the air tank 6 filled up with compressed air by compressor 5, the air spring 10 is filled up with air through pipe 7, pressure regulating valve 8 and pipe 9, under the pressure determined by the pressure regulating valve 8, its drive unit 26 and control unit 27. At jackknifing angle 0° the compressed air in the air spring 10 presses the mobile rigid walls 12 and 13 against stops 14a and 14b fixed to the front vehicle 2. When the articulated motor vehicle 1 travels in a curve, the jackknifing angle of the front vehicle 2 and trailer 3 will vary, deviating from 0°, and in proportion with the existing jackknifing angle the frame 16 surrounding the air spring 10 will move away, while for instance in case of clockwise deviation of the angle lever 21, the mobile stop 18a supported by the counter stop 17a carries along the mobile rigid air spring wall 12, i.e. it compresses the air spring 10. Meanwhile—since the air space of the air spring is closed—the air pressure increases in the air spring 10, exerting a reaction force on frame 16 corresponding to the spring characteristic, whereby torque arises around the articulation forcing the trailer 3 towards jackknifing angle 0°.

When the articulated motor vehicle 1 travels out of the curve, the reaction force exerted by the air spring 10 assists in the reduction of the angle between the trailer 3 and front vehicle 2, i.e. assists in straightening the articulated motor vehicle 1. With counter directional jackknifing of the trailer 3, the apparatus functions similarly as described above. The characteristic of the air spring 10—especially in the rolling membrane construction—is adjustable within wide limits to a more progressive character at increasing jackknifing angles conforming to the requirement of the present usage.

Figure 2:
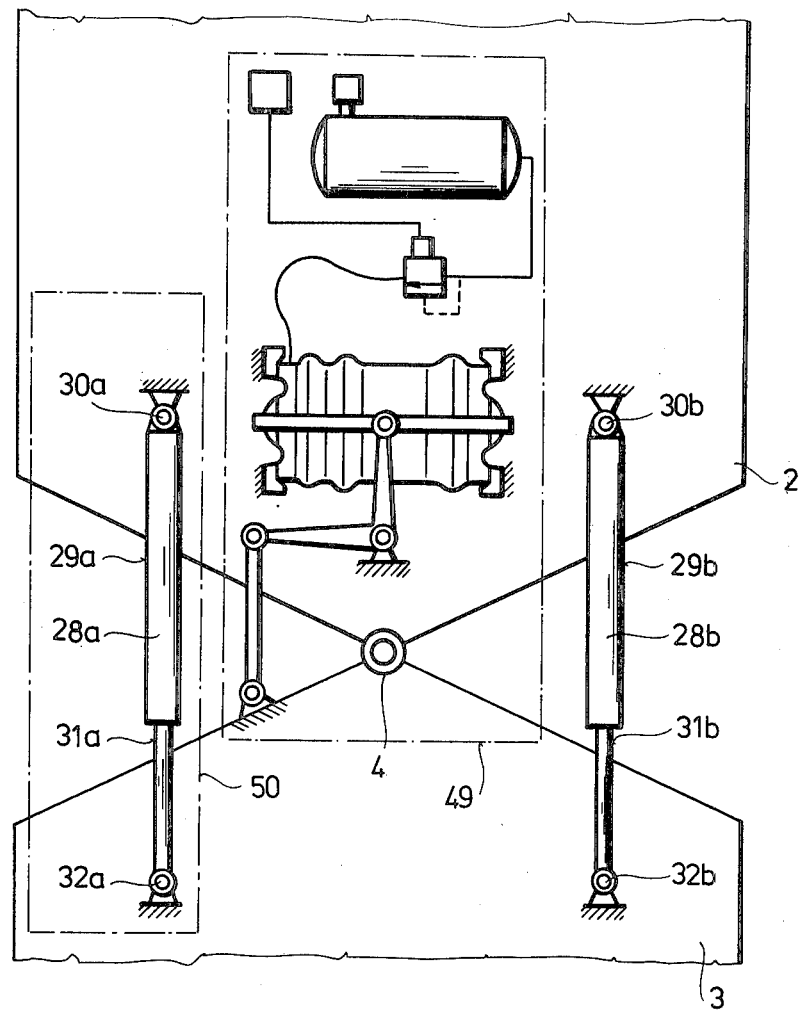
FIG. 2. A schematic representation of the apparatus according to FIG. 1, complemented with a hydraulic brake.

The construction according to FIG. 2 illustrates such a solution, wherein the jackknifing angle influencing unit of the apparatus is the same as that of FIG. 1., and the functional effect of a progressive characteristic braking device connected to the two vehicle units is superimposed on the functional effect of the jackknifing angle influencing unit.

The jackknifing angle influencing unit 49 is identical in every detail with the apparatus shown in FIG. 1.

Hydraulic braking devices 28a and 28b of progressive characteristic functioning in two directions are built in symmetrically outside the articulation 4, between the front vehicle 2 and trailer 3, the cylinders 29a and 29b of which with articulations 30a and 30b are fixed on the front vehicle 2, while pistons 31a and 31b with articulations 32a and 32b are fixed on the trailer 3.

The apparatus according to FIG. 2 functions as follows:

Operation of the jackknifing angle influencing unit 49 is fully identical with the operation of the apparatus according to FIG. 1., thus when the jackknifing angle deviates from 0°, the compressed air spring exerts a reaction force on the frame 16 corresponding to the increased air pressure and spring characteristic, whereby torque arises around articulation 4, forcing the trailer 3 towards a jackknifing angle of 0°, irrespective of the jackknifing angle variation.

Should the jackknifing angle vary, the torque around the articulation 4—functioning always counter to the jackknifing angle variation, i.e. at increasing jackknifing angle the braking effect is against the increase, and at decreasing jackknifing angle it is against the decrease— exerted by the braking force of the hydraulic piston braking devices 28a and 28b—always counter to the direction of movement—is superimposed on the torque arising from the reaction force of the air spring 10. The braking devices 28a and 28b are of progressive characteristic, their brake resistance is in proportion with the motion velocity of cylinders 29a, 29b and pistons 31a, 31b in relation to each other. The hydraulic braking devices 28a and 28b exert a vibration damping effect against the vibrations forced by the air spring 10, and prevent the trailer 3 of the articulated motor vehicle 1 from snaking, when travelling in a straight line.

Figure 3:
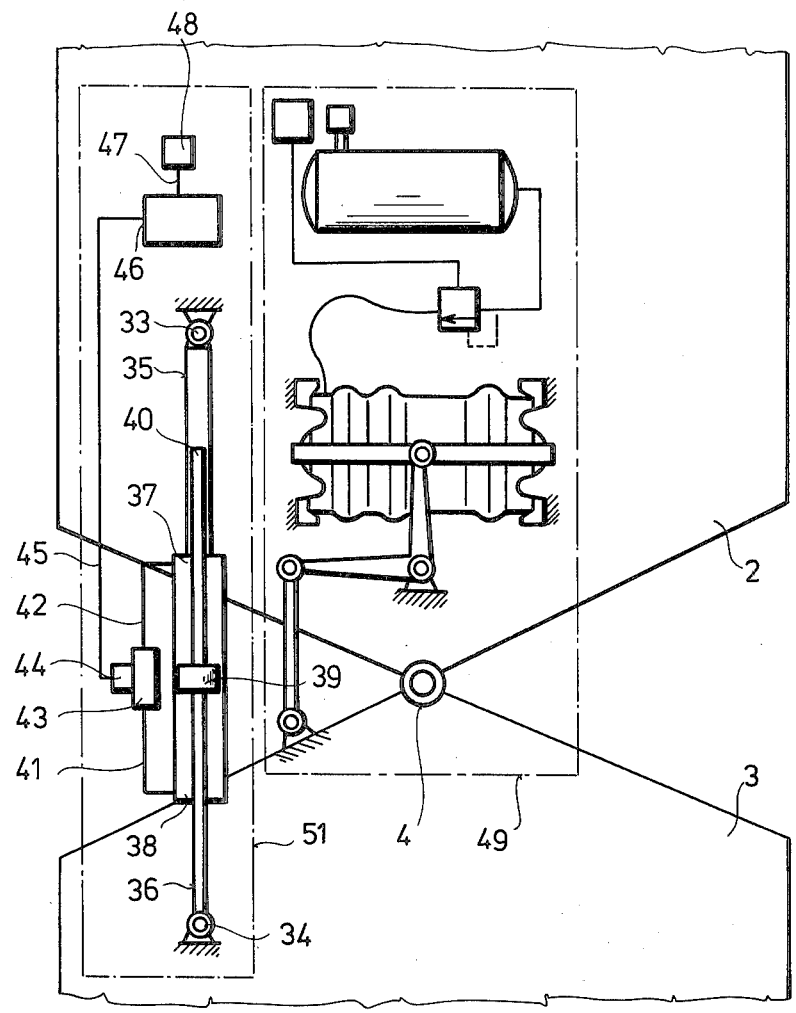
FIG. 3. A schematic representation of another embodiment of a jackknifing angle influencing apparatus according to the invention built up with a pneumatic jackknifing angle influencing unit and a locking unit provided with hydraulic devices limiting the existing permissible maximum jackknifing angle.

The jackknifing angle influencing apparatus presented in FIG. 3, consists of two units: pneumatic jackknifing angle influencing unit 49 identical with the one shown in FIG. 1., and a jackknifing angle limiting unit 51 provided with hydraulic power devices.

Cylinder 35 of the braking device 40 having a progressive characteristic, functions in two directions and is fixed with articulation 33 to the front vehicle 2, and piston rod 36 of piston 39 is fixed with articulation 34 to trailer 3. Working spaces 37 and 38 of the cylinder 35 are connected with pipes 41 and 42 to the flow regulating locking valve 43. The flow regulating locking valve 43 is in functional connection with drive unit 44, which is connected through the control signal transmitting cable 45 to the locking control unit 46, which with signal transmitting cable 47 is connected to sensor 48, sensing the motion-dynamic characteristic.

The control signal—that actuates the driver unit 44 which in turn actuates the flow regulating locking valve 43—in the locking control unit 46 is ordered according to a fixed rule to the value of the signal sensed by the sensor 48.

The jackknifing angle influencing apparatus according to FIG. 3, functions as follows:

Operation of the apparatus can be divided into two phases. In the first phase exclusively the jackknifing angle influencing operation mode exists, in the second phase the locking device steps into action and upon reaching the existing permissible maximum jackknifing angle, it prevents further increase of the jackknifing angle.

Operation of the jackknifing angle influencing unit 49 is fully identical with that of the appartus shown in FIG. 1, thus at a jackknifing angle deviating from 0°, the compressed air spring 10 exerts a reaction force on the frame 16 corresponding to the increased air pressure and spring characteristic, whereby torque arises around the articulation 4, forcing the trailer towards jackknifing angle 0°, irrespective of the jackknifing angle variation.

On this torque is superimposed the torque exerted on articulation 4 by the force arising in articulations 33 and 34 necessary to put the liquid in motion which during compression of the braking device 40 flows from working space 37 through pipe 42 into the working space 38 through pipe 41 against the resistance determined by the flow regulating valve 43. If the magnitude of the jackknifing angle does not reach the value of the motion-dynamic characteristic sensed by the sensor unit 48, at which the control unit 46 would order the locking, then the locking device 51 does not lock. If the jackknifing angle reaches the value at which the value of the motion-dynamic characteristic transmitted by the signal transmitting cable 47, sensed by the sensor unit 48 is of such magnitude that the locking control unit 46 emits a driver signal according to the programmed rule, then as a result of the signal transmitted through the control signal transmitting cable 45 the driver unit locks the flow regulating valve 43. At the shut valve position the liquid can not flow between the working spaces 37 and 38, thereby preventing the increase of the jackknifing angle. As soon as the motion-dynamic characteristic sensed by the sensor unit 48 varies in such a way, that the locking control unit orders releasing signal to this value, the driver unit 44 opens the flow regulating valve 43 and the free flow is restroed between the working spaces 37 and 38, and operation of the locking device 51 is stopped.

When the articulated motor vehicle 1 moves out of a curve the reaction force exerted by the air spring 10 assists the reduction of the jackknifing angle between the trailer 3 and front vehicle 2, while the liquid flowing through pipes 41 and 42 against the resistance of the flow regulating valve 43 from working space 37 into working space 38 exerts a vibration damping effect onto the front vehicle 2 and trailer 3 turning off in relation to each other.

When the articulated motor vehicle 1 travels in straight line, the power device 40 exerts a vibration damping effect against the vibrations forced by the air spring 10 and prevents the trailer 3 from the snaking motion.

Suitably several motion-dynamic characteristic sensing elements are connected to the locking control unit 46, e.g. the elements sensing the steering angle of the front wheel and the jackknifing angle, and a permissible jackknifing angle value is stored for each steering angle of the wheel in the locking control unit 46, and the locking control unit gives locking signal at a jackknifing angle exceeding the value of the permissible jackknifing angle.

What we claim is:

1. In an anti-jackknifing apparatus for an articulated motor vehicle, having damping means containing a pressure medium which is responsive to the magnitude of the jackknifing angle to vary the volume thereof and including two opposite relatively movable walls, the damping means being connectable to one of the vehicle units, and the movable walls being connectable to the other vehicle unit via transmission elements, the improvement wherein the damping means comprises an air spring and a working medium supply source connected thereto, means forming stops on said one of the vehicle units for mounting the air spring and limiting the extreme positions of the movable walls and a frame surrounding the air spring and engaging the walls and connected to one transmission element on said one vehicle unit.

2. The apparatus according to claim 1, wherein the damping means further comprises an adjustable flow regulating valve connecting the air spring and working medium supply source.

3. The apparatus according to claim 2, wherein the damping means further comprises control means connected to the flow regulating valve for producing an actuating signal for a specified value of selected motion-dynamic characteristic.

4. In an anti-jackknifing apparatus for an articulated motor vehicle, having damping means containing a pressure medium which is responsive to the magnitude of the jackknifing angle to vary the volume thereof and including two opposite relatively movable walls, the damping means being connectable to one of the vehicle units, and the movable walls being connectable to the other vehicle unit via transmission elements, the improvement wherein the damping means comprises an air spring and a working medium supply source connected thereto and further comprising a hydraulic braking device of progressive characteristic functioning in two directions pivotably connected between the vehicle units.

5. The apparatus according to claim 4, further comprising locking means pivotably connected between the two vehicle units for limiting the existing permissible jackknifing angle for a given steering angle and motion-dynamic characteristic value.

6. The apparatus according to claim 5, wherein the locking means comprises a locking control unit and further comprising a flow regulating valve interconnecting the working spaces of the hydraulic braking device of progressive characteristic with the locking control unit.

* * * * *